US009901835B2

(12) United States Patent
Kuklok

(10) Patent No.: US 9,901,835 B2
(45) Date of Patent: *Feb. 27, 2018

(54) FANTASY SPORTS SYSTEM AND METHOD

(71) Applicant: Kierian B. Kuklok, San Diego, CA (US)

(72) Inventor: Kierian B. Kuklok, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,226

(22) Filed: Mar. 24, 2017

(65) Prior Publication Data
US 2017/0197151 A1  Jul. 13, 2017

Related U.S. Application Data

(63) Continuation-in-part of application No. 14/312,460, filed on Jun. 23, 2014, now Pat. No. 9,616,347.

(60) Provisional application No. 61/866,457, filed on Aug. 15, 2013.

(51) Int. Cl.
A63F 13/828    (2014.01)
A63F 13/35     (2014.01)
A63F 13/537    (2014.01)
A63F 13/87     (2014.01)
A63F 13/46     (2014.01)

(52) U.S. Cl.
CPC ............ *A63F 13/828* (2014.09); *A63F 13/35* (2014.09); *A63F 13/46* (2014.09); *A63F 13/537* (2014.09); *A63F 13/87* (2014.09)

(58) Field of Classification Search
USPC ...................................................... 463/42, 43
See application file for complete search history.

(56) References Cited

U.S. PATENT DOCUMENTS

| 9,138,652 B1* | 9/2015 | Thompson | H04N 21/2358 |
| 2010/0137057 A1* | 6/2010 | Fleming | A63F 13/12 463/25 |
| 2010/0210330 A1* | 8/2010 | Fleming | G07F 17/32 463/2 |
| 2014/0045595 A1* | 2/2014 | Baschnagel, III | A63F 13/10 463/40 |
| 2015/0375117 A1* | 12/2015 | Thompson | A63F 13/35 463/9 |

* cited by examiner

*Primary Examiner* — Pierre E Elisca
(74) *Attorney, Agent, or Firm* — Steptoe & Johnson LLP

(57) ABSTRACT

A fantasy sports league or contest where true fans are rewarded for allegiance to favorite teams. The league or contest is configured so that competition extends through playoffs of a league or sport upon where the fantasy sports league or contest is based.

11 Claims, 6 Drawing Sheets

FANTASY SPORTS SYSTEM AND METHOD

CROSS-REFERENCE TO RELATED APPLICATIONS

This application is a continuation-in-part of U.S. Ser. No. 14/312,460, filed Jun. 23, 2014, which claims the benefit of U.S. Provisional Application No. 61/866,457, filed Aug. 15, 2013, which are herein incorporated by reference in their entirety.

BACKGROUND

The present disclosure relates to fantasy sports, and in particular, to fantasy sports leagues or contests where true fans are rewarded for their allegiance to their favorite team.

Many millions of people play fantasy sports leagues. In fact, over 30 million people actively play fantasy football alone. Fantasy league players participate either in a league among their friends and co-workers or in leagues set up by the various fantasy websites. In fantasy football, leagues are generally limited to 12 teams or less. Each league drafts their players from amongst all NFL players and each player is on one roster only. Each player then sets his roster weekly, makes trades, picks up available players and runs his team like a general manager (GM) would. League play ends usually with two games left in the season and the last two games serve as the playoffs. Each league winner is determined by the end of the regular season.

Most fantasy sports websites allow participants to create a league, join a league or activate their previous league. Many fantasy websites are free to play at no cost, while others charge a premium but provide more data such as statistics, expert analysis, trends, live data, injury reports, and etc. For fantasy football, Yahoo.com currently lays claim to be the most utilized site followed by ESPN.com and then NFL.com. Revenue for these sites is generated through advertising and player purchased expert advice (e.g., ESPN Insider paywall). Adweek estimates that fantasy football is a billion dollar business.

One of the commonly heard and often written about negatives or dilemmas for fantasy football players is that you end up scoring points at the expense of your favorite team. This can be simply referred to as the dilemma.

Imagine, in a football context that Peyton Manning throws an incredible four touchdown passes against your favorite team, leaving you and your fellow fans devastated by the amazing performance. But one fan concludes that at least Peyton Manning was on her fantasy football team. This fan experiences the dilemma in that her favorite team lost, but in fact her fantasy team benefits at her favorite team's expense.

Another often expressed limitation of fantasy sports leagues is their ending prior to the playoffs of the league upon which they are based. This occurs because the players forming the fantasy league teams may not make the playoffs, and without another draft, certain fantasy teams will not have the participation of their fantasy players during the playoffs and thus would not accumulate any scoring points for the fantasy league.

Accordingly, what is needed and previously unavailable, is a fantasy sports league which addresses the dilemma and/or a lack of participation during playoffs. Also, what is needed is a system and method for providing notifications to users of when a roster move is required. The present disclosure addresses these and other needs.

SUMMARY

Briefly and in general terms, the present disclosure is directed towards a fantasy sports league or contest. In one aspect, the league or content addresses a dilemma where a participant's favorite team suffers at the expense of players on the participant's fantasy team. In another aspect, the league or contest continues through playoffs occurring in the sports league upon which the league or contest is based. It has been contemplated that in certain embodiments, a fantasy sports league or contest involves only fans of the same team competing against one another, fans of any team competing against one another, and fan bases of one team competing against a fan base of another team.

In one or more specific embodiments, the presently disclosed league or contest provides each participant an opportunity to cheer for his or her favorite team while participating in the potentially largest contest ever provided by the base league and its corporate sponsors. The league or contest further provides existing fantasy players, a huge worldwide business enterprise already, another avenue for participation, as well as can provide an opportunity to combine fantasy with reality in an interactive and engaging contest. Participation can be free and the promotion offers weekly and ever-increasingly valuable prizes throughout the entire base league schedule, with one lucky person becoming the season's big winner, year in and year out. Moreover, the contest or league can provide the base league and each and every one of its member franchises with the immeasurable benefit of having a new and creative way to motivate fans to follow the weekly league play and become even more loyal to their chosen team. This will enhance the interest, success and global popularity of the base league.

The present disclosure is further directed to a method or system including a computer readable medium and a data structure stored thereon adapted and configured to route signals. The data structure includes a computer readable system for playing a fantasy sport including a processing system configured and adapted to communicate with a plurality of computers. The processing system is arranged to accept input of a real-life sport selection having a multiple game schedule, a plurality of players each of which forms a fantasy team each including at least one actual player from the actual sport selected, a selection of a plurality of scoring statistic categories based on actual types of scoring statistic categories associated with the actual sport to measure the performance of the fantasy team, a selection of a number of series corresponding to an actual yearly schedule of the sport, and optionally a selection of a number of games in each series, wherein the processing system calculates fantasy scoring statistics based on the actual scoring statistic categories accrued by the fantasy team over the at least one series. The processing system can further limit use of a player from a team which is not from a participant favorite team, and/or to assign additional scoring for using players from the participant favorite team. The processing system can further handle extending a league or contest through a playoff in a base league.

Other features and advantages of the present disclosure will become apparent from the following detailed description, taken in conjunction with the accompanying drawings, which illustrate, by way of example, the principles of the invention.

DETAILED DESCRIPTION OF THE PREFERRED EMBODIMENTS

Figure 1:
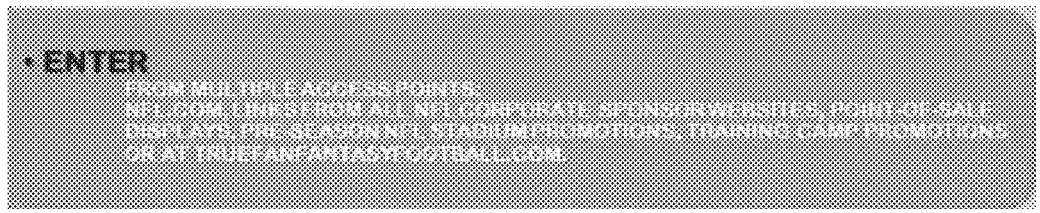
FIG. 1 is one step of a flowchart, describing entry into one embodiment of a fantasy league or contest.
Figure 2:
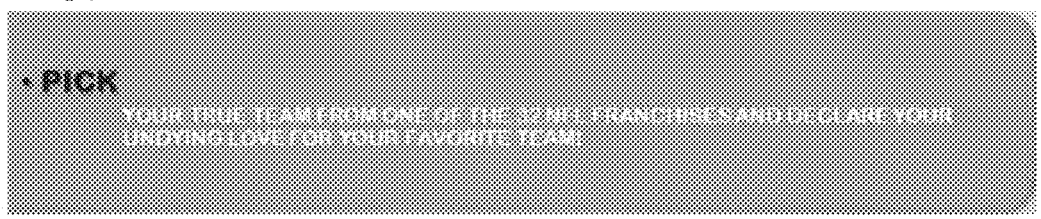
FIG. 2 is a second step of a flowchart, describing picking a favorite team for one embodiment of a fantasy league or contest.
Figure 3:
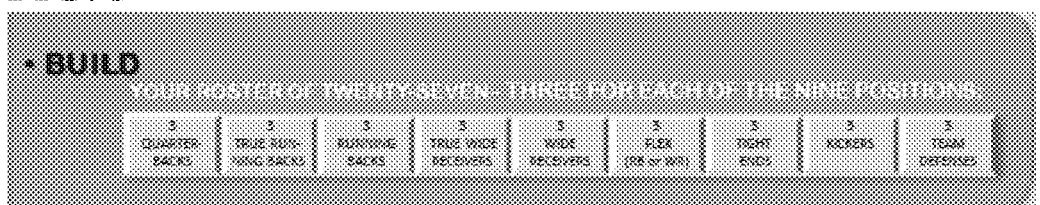
FIG. 3 is a third step of a flowchart, describing building a roster for one embodiment of a fantasy league or contest.
Figure 4:
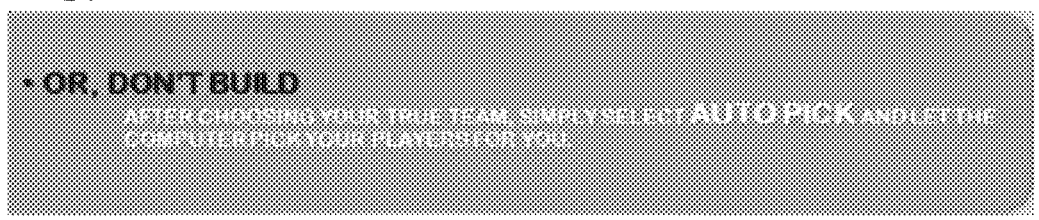
FIG. 4 is a fourth step of a flowchart, describing options to facilitate a roster for one embodiment of a fantasy league or contest.
Figure 5:
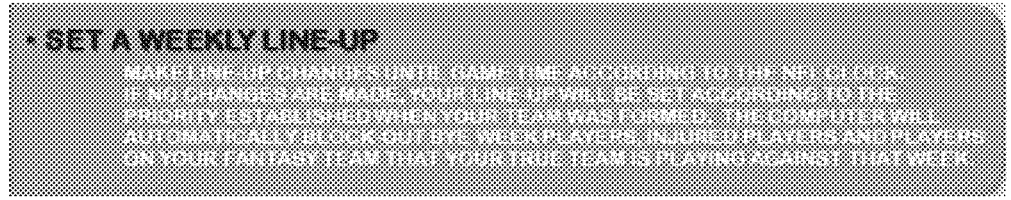
FIG. 5 is a fifth step of a flowchart, describing details concerning making line-ups for one embodiment of a fantasy league or contest.
Figure 6:
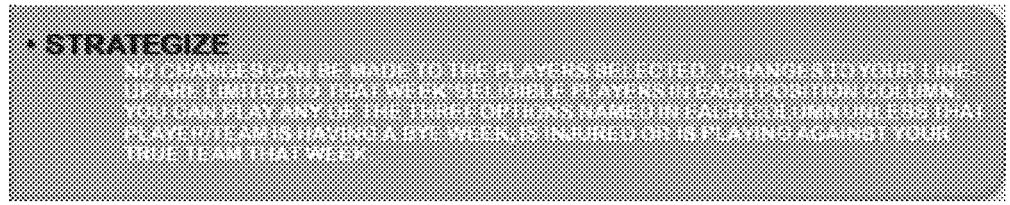
FIG. 6 is a sixth step of a flowchart, describing possible strategies for one embodiment of a fantasy league or contest.
Figure 7:
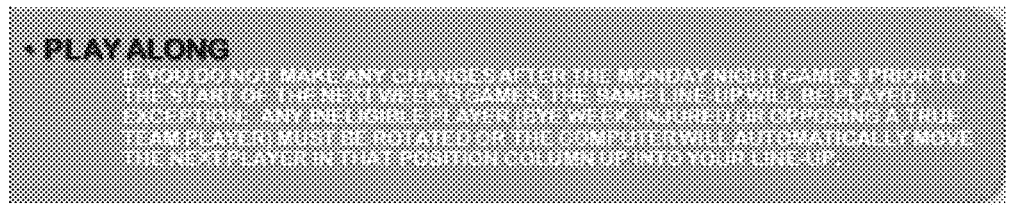
FIG. 7 is a seventh step of a flowchart, indicating further strategies for one embodiment of a fantasy league or contest.
Figure 8:
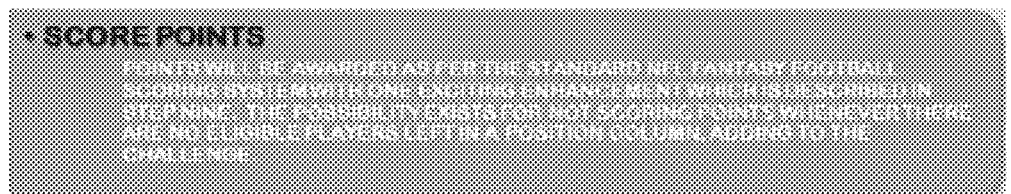
FIG. 8 is an eighth step of a flowchart, describing scoring for one embodiment of a fantasy league or contest.
Figure 9:
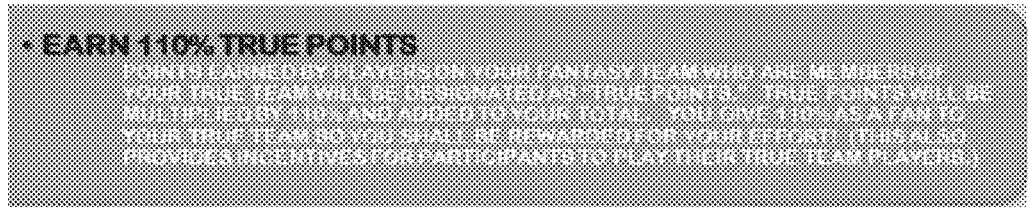
FIG. 9 is a ninth step of a flowchart, describing further details concerning scoring for one embodiment of a fantasy league or contest.
Figure 10:
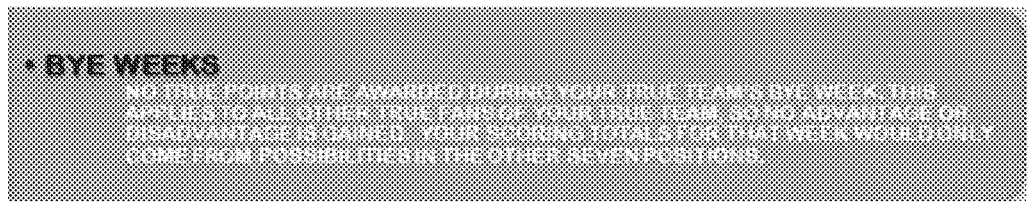
FIG. 10 is a tenth step of a flowchart, detailing aspects occurring during a bye month for one embodiment of a fantasy league or contest.
Figure 11:
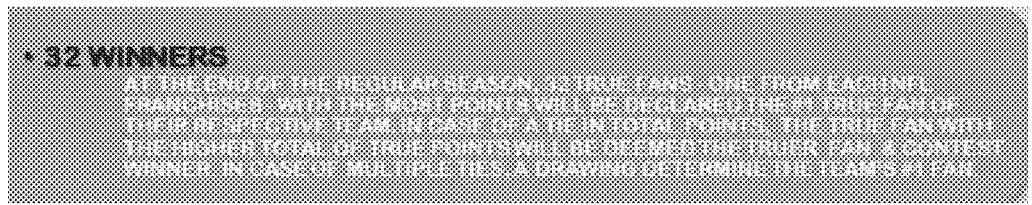
FIG. 11 is an eleventh step of a flowchart, explaining certain results of one embodiment of a fantasy league or contest.
Figure 12:
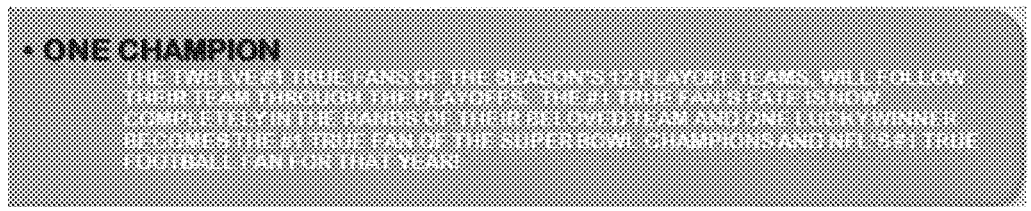
FIG. 12 is a twelfth step of a flowchart, explaining certain further results for one embodiment of a fantasy league or contest.

The present disclosure is directed towards a fantasy sports league or contest. Although one embodiment of a league or contest is described, the disclosed systems and methods are applicable to various sporting events and leagues. Further, the present approach addresses the dilemma as well as extending play through the playoffs. The disclosed system and method may be applied to any collection of users. For example, in certain embodiments, a fantasy sports league or contest may involve only fans of the same team competing against one another, fans of any team competing against one another, and fan bases of one team competing against a fan base of another team.

The disclosed fantasy league or contest is a unique and innovative concept which can appeal to many fantasy league participating players who are 'fanatic' enough to take the time and effort to be the GM of a self-labeled team. In a football context for example, adding to the 30 million fantasy players the unlimited number of existing NFL fans with an emotional and nostalgic connection to one team by virtue of birth, family tradition, marriage, or residency, and you have a staggering number of potential new fantasy players. The existing fan base of each franchise is ready made for true fan fantasy participants.

Tapping into this existing pool alone makes the present disclosure a powerful marketing and revenue generating tool. Yet, it is the unique ability of this approach to add millions of new players that doubles its punch.

This premise is based on a simple concept that more than the 30 million current pool of fantasy participants do not represent the total universe of true fans but rather, there are more true fans than the current number of fantasy players.

It is suggested that it could very well be that the 30 million current pool is just the tip of the iceberg. That for every fantasy player there are even more true fans who do not want to spend the time or effort to run a self-labeled team, but are die hard loyal dedicated fans of their favorite team. And because of the present approaches' structural differences from traditional fantasy leagues, it will draw the true fans to join the contest believing, as they already do, they are indeed the truest fan of all.

The powerful fantasy promotional concept of the present contest or league has broad-based appeal and built-in longevity. It combines the global popularity of building one's own fantasy team with the ease and simplicity of joining a contest, thereby challenging the loyalty of millions upon millions of football fans, thereby reaching across all ages and demographics.

The disclosed embodiments of contest or league may not compete with existing fantasy leagues, it is an additional way to play. Mass appeal comes from its enhancements to existing fantasy football formats.

As stated, the 30 million people actively playing fantasy football participate in small leagues among friends and co-workers or in large leagues set up by various fantasy football websites. Yahoo.com currently lays claim to be the most utilized site, followed by ESPN.com and the NFL.com.

Currently, fantasy football leagues are generally limited to 12 teams or less. Each league drafts their players from amongst all NFL players and each player is on one roster only. Each player then sets his roster weekly, makes trades, picks up available players and runs his team like a GM would. League play ends usually with two games left (week 15) in the season and the last two games serve as the playoffs. Each league winner is determined by the end of the regular season.

Fantasy sports websites allow the more avid players to create a league, join a league or activate their previous league. Many fantasy websites are free to play; others charge a premium, but provide more data: statistics, expert analysis, trends, live data, injury reports, etc. Revenue for these sites is generated through advertising and player purchased expert advice (e.g., ESPN Insider paywall.)

The presently described league or contest eliminates the commonly heard and often written about negative for fantasy football players, the "dilemma" of scoring points at the expense of your favorite team.

By never allowing a fantasy player to compete against their favorite team, participants do not have to ever again root for their fantasy players at the expense of their beloved team.

Thus, the disclosed contest or league removes the entry barriers that keep many fans from playing. It creates a fantasy league that is simpler to understand, easier to join and more fun to play especially for each team's loyal and diehard fan base. GMs can still strategize, but even "auto pick" entries are available for the lighthearted, but true fan.

The disclosed approach not only directs participants, it keeps them engaged through e-mail, mobile applications, and social media (Facebook, Twitter and etc.) throughout the entire season. The mobile applications and social media components may help the NFL or other leagues reach a whole new generation of fans.

In one particular embodiment of the present contest or league, each contestant competes only in their chosen team's "bracket" and they are pitted only against all other fans of that particular team—Vikings with Vikings, Bears with Bears, etc. and each franchise has a winner every week and an overall winner at the end of the regular season.

It is an opportunity to market base leagues and promote all the base leagues have to offer, such as team gear and merchandise, website content, the Network content and promotional spots for upcoming games, etc.

The disclosed contest or league would direct fans to base league websites (such as NFL.com) and corporate sponsor's websites and keep them actively engaged to the sites throughout the entire season culminating with the championship game (i.e. Super Bowl).

Weekly leaderboards (and the winning of ever more valuable prizes) keep the momentum going. Wednesday or Thursday updates help lead into the Thursday night games. In other embodiment, leaderboards may be updated as often as desired, or after each game, or leaderboards may be updated in real-time.

Then, in a pro football league context, for example, those "32 Winners" emerge, one from each NFL franchise, and each team is now represented by a prize winning Number 1 True Fan.

But, unlike current fantasy football formats, this competition does not cut off before the real football season ends. In fact, the number 1 true fan's continuing journey becoming its own "reality" based platform for the playoff advancing franchises to appeal to all of their team's loyal fans by having them follow and root for that chosen representative as those playoff advancing True Fans get to follow their chosen teams into the playoffs for the next level of excitement and prizes.

Finally, again paralleling real football, one team wins the Super Bowl and that team's number 1 true fan or participant becomes the contest's "One Champion," and grand prize winner.

Referring now to FIGS. 1-12, various aspects of a fantasy sports league or contest 100 are presented. Here, for illustration purposes only, a fantasy football league or contest is described, and as discussed above, the concepts described below can apply to any event or sport.

In a first step 102, a participant enters the league or contest 100 through the Internet and typically joins a website. A participant may enter a league through multiple access points, such as website that includes a fantasy league, a link from an NFL Corporate Sponsor Website, point-of-sale displays, pre-season NLF stadium promotions, training camp promotions and TrueFanFantasyFootball.com.

Next, the participant picks their True Team and thereby declaring undying support for the favorite team (104).

Three players/teams are then drawn for each of the nine positions (106):

Quarterback 200
True Running Back-three of your True Teams running backs 202
Running Back 204
True Wide Receiver-three of your True Teams wide receivers 206
Wide Receiver 208
Flex Player-either a Running Back or Wide Receiver 210
Tight End 212
Kicker 214
Team Defense 216

Alternately, in an additional step (108), after choosing allegiance to your True Team, an Autopick selection can be engaged and employed to select team members.

A participant's weekly line-up can be set up until game time according to the NFL Clock (110). If no line-up changes are made, the line-up will be set according to the priority established when the participant's team was formed. The system computer or server may automatically block out bye week players, injured players and players on your fantasy team that your True Team is playing against that week. For example: If Aaron Rodgers is your #1 quarterback and your True Team is the Vikings, you cannot have Aaron Rodgers in your line-up in the weeks the Packers play the Vikings. This functions to avoid the Dilemma. The system computer or server may automatically inform the fantasy player of any automatic changes to the line-up, either through text, email, voice message, or posting to the fantasy website or social media.

Changes to your line-up are limited to the players in each position column (112). A participant can play any of the three players/teams in each column unless that player/team is a bye week player, an injured player or a player on a fantasy team that the participant's True Team is playing against that week.

If no changes are made (114), the same line-up will go forward into the next week with the exception of those players that become ineligible (bye week, injured or opposing team player). A participant may change those players oneself or the computer will automatically move the next player in that position column up into the line-up. The possibility of not having any eligible players in a position column exists and no points will be awarded for that position that week. In one embodiment, participants are unable to change or add players at any time after the start of the season. In other embodiments, players are able to trade, add, and drop players during the season.

Scoring (116): Points will be awarded as per standard fantasy football scoring system. In other embodiments, points may be awarded based on any existing fantasy football scoring system or points may be modified as desired by the participants.

True Points (118): Points earned by players on a participant's fantasy team that are members of your True team will be designated as True Points. In one embodiment, the total amount of True Points will be multiplied by 110% and added to totals. This also incentivizes participants to play their True Team players. In other embodiments, True Points may be weighted by any percentage. The multiplying percentage may be any fixed number or percentage throughout the season. In one embodiment True Points are multiplied by 200% in order to incentivize participants to play their True Team players.

No True Points are awarded your True Team's bye week (120). This applies to all other True Fans of a True Team so no advantage or disadvantage is gained. Scoring totals for that week will be from the other seven positions.

32 Winners-One Champion (122): At the end of the regular season, the True Fan from each of the 32 Teams with the highest Total Points will be the #1 True Fan of their True Team (e.g. #1 True Chargers Fan). In one embodiment, if there is a tie in Total Points, the True Fan with the higher total of True Points will be deemed the Truer Fan and be declared the winner. In case of multiple ties in one embodiment, a drawing amongst the winners at each team's headquarters will determine the winner (possibly by a team cheerleader or face of the franchise player). In another embodiment, the system will randomly pick one bench player for each participant and keep track of the points score by the randomly picked player. The system may randomly select a new bench player each week and a total of points scored by the random selection will be used in the event of ties with other participants. In one embodiment, if the random player selected by the system is a member of the participant's true team, then a multiplier, such as 200%, may be used to tally additional points. In other embodiments, a multiplier is not used. The twelve #1 True Fans of the 12 playoff teams (124), will follow along with their team and the #1 True Fan of the Super Bowl Champions will be the NFL #1 True Fan of 2014.

Figure 13:
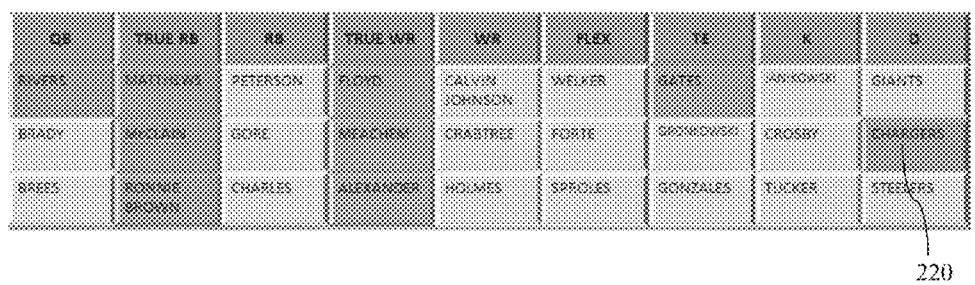
FIG. 13 is a chart, depicting one representation of a team for one embodiment of a fantasy league or contest.
Figure 14:
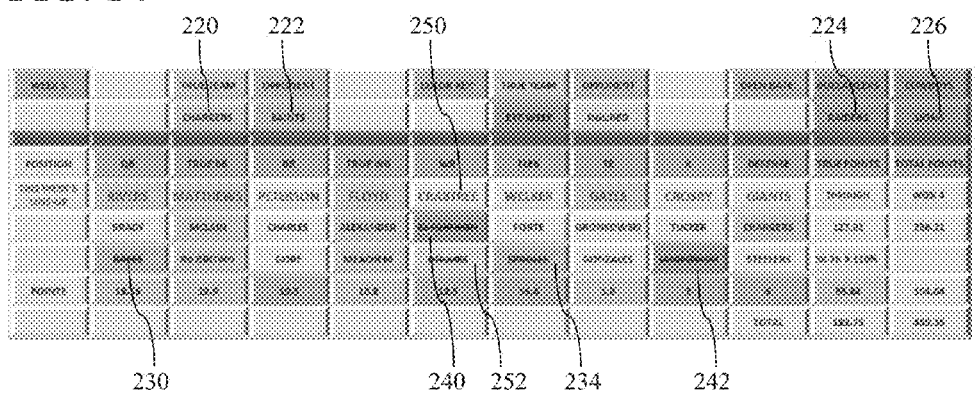
FIG. 14 is a chart, depicting results for one week for one embodiment of a fantasy league or contest.

With reference now to FIGS. 13-16, an example of one approach to the present fantasy sports contest or league is presented. FIG. 13 depicts a possible representation fantasy team for a participant choosing the Chargers 220 as their fantasy team. As shown in FIG. 14, the Chargers opponent for Week 5 was the New Orleans Saints 222. Therefore, the Saints players, Drew Brees 230 and Darren Sproles 234 are lined out and medium shaded which demarcates an opponent that week. No points can been awarded for the Saints players performances that week, eliminating the "dilemma". The players are moved to down their respective position column (QB, WR2 and Flex).

The Oakland Raiders 224 and Detroit Lions 226 have an open date or "bye" week. Therefore, Calvin Johnson 240 of the Lions and Sebastian Janikowski 242 of the Raiders are lined out and dark shaded in which demarcates a "bye" week player. The players have been moved down their respective position column (WR1 and K).

Michael Crabtree 250 is the only playable wide receiver in the WR2 position column and he automatically moved up to the "this week" line.

Santonio Holmes 252 suffered a season ending injury in Week 4. He has been lined out and light shaded which demarcates injured and unable to play. His name is moved to the bottom of his respective position column (WR2). Once a player goes on the Injured Reserve list and is out for the season, the name will remain lined out and light shaded for the rest of the year.

Again, as stated, points can be awarded as per NFL.com Fantasy Football website.

True Points are the total of points earned by your True Team players or your True Team defense. True Points are totaled separately in case of a tie-breaker at the end of the regular season. In the example, the participant is assigned 440.35 total points.

Figure 15:
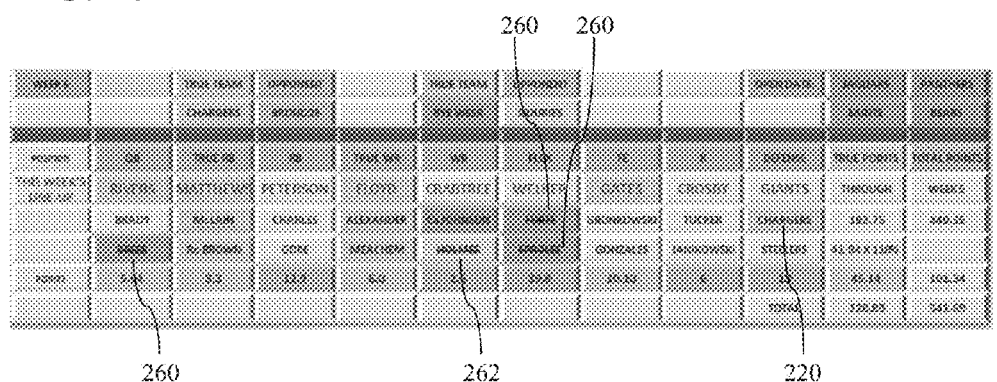
FIG. 15 is a chart, depicting results for another week for one embodiment of a fantasy league or contest.
Figure 16:
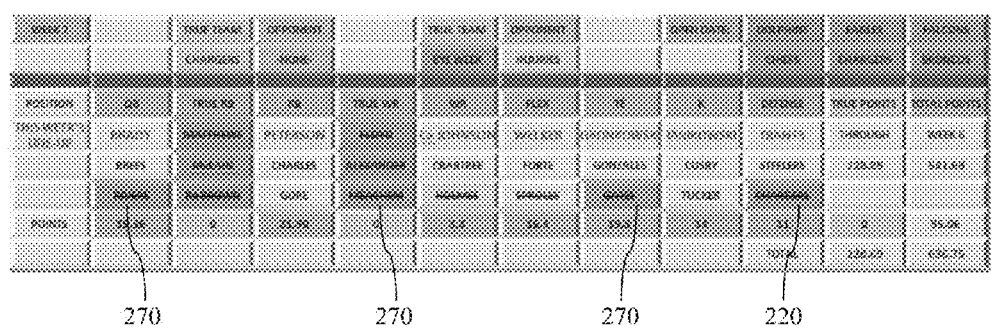
FIG. 16 is a chart, depicting results for yet another week for one embodiment of a fantasy league or contest.

As shown in FIG. 15, week 6 demonstrates no opponent players on your team therefore no medium shaded player boxes.

The players from teams with an open date or "bye" week are lined out and dark shaded 260. The injured player 262 remains lined out and light shaded. These players are moved down their respective position column. Here, the total points accumulated reaches 541.69

Week 7 (see FIG. 16) demonstrates an open date or "bye" week for your True Team. Your True Team players 270 are lined out, dark shaded and moved down their respective position columns. No opponent medium shaded boxes are necessary and no True Points are awarded for this week, and the total points awarded are 636.75 after seven weeks.

Participants can choose the players they want to fill the "this week" line with the exception of any player lined out ("bye" week players, injured players or opposing team players). If they choose not make roster moves, the computer can move the next eligible player up to the "this week" line. It is to be noted that players can only be moved within in their respective position column. Moreover, each team must have a minimum of 4 of the 27 available positions filled by players or defenses of the True Team. This could be modified to more required True Team selections to increase variability.

The league or contest continues through all of the games of the base league. Once the playoffs start, the fantasy teams associated with playoff teams continue to participate and advance if the playoff team wins.

By way of example only, another embodiment of a fantasy basketball league or contest will now be described. A participant enters a fantasy basketball league or contest through the Internet and typically joins a website. A participant may enter a league through multiple access points, such as website that includes a fantasy league, a link from a corporate sponsor website, point-of-sale displays, pre-season promotions from a professional league, training camp promotions and TrueFanFantasyFootball.com.

Next, the participant picks their True Team and thereby declaring undying support for the favorite team. The fantasy team will consist of nine players, including, a point guard, shooting guard, true guard, small forward, power forward, true forward, center, a true center, and an additional forward or center (a utility position). In one embodiment, three players are then drawn for each of the nine positions. Any number of positions or players may be on a fantasy team along with any number of backup players as desired or set by the league administration. The terms true guard, true forward, and true center refers to a player from the participant's selected true team at those positions. In one embodiment, only one true player at each position is selected instead of three players. In another embodiment, after choosing a true team, an autopick selection can be engaged by the system and employed to select team members.

A participant's weekly line-up can be set up until game time or may be set by a certain time on any day of the week. With multiple professional basketball games in a week, the participant's lineup can be set up for each game of the week. If no line-up changes are made, the line-up will be set by the system according to the priority established when the participant's team was formed. In one embodiment, the administrator or system may automatically block out players not scheduled to play, injured players and players on your fantasy team that the participant's true team is playing against that week. For example: If Chris Paul is your #1 point guard and your true team is the Bulls, the system will not allow Chris Paul in the lineup for a game against the Bulls. In this way, the system functions to avoid the dilemma.

In one embodiment, changes to a line-up are limited to the players at each position. A participant can play any of the players on his roster unless that player is not playing in a certain game for a variety of reasons or a player on a fantasy team that is playing against the participant's true team.

In one embodiment, if no changes are made, the same line-up will go forward into the next game with the exception of those players that become ineligible (bye week, injured or opposing team player). A participant may change those players oneself or the administrator or system computer will automatically move the next player in that position up into the starting line-up. The possibility of not having any eligible players in a position column exists and no points may be awarded for that position that week. In one embodiment, participants are unable to change or add players at any time after the start of the season. In another embodiment, participants are allowed to trade, drop and select additional players from a pool of available players.

Scoring: Points will be awarded as per standard fantasy basketball scoring system in one embodiment. In another embodiment, points may be awarded based on any existing fantasy basketball scoring system or points may be modified as desired by the participants or league administrator. As an example only, fantasy players may receive 0.5 points per point, 1 point per rebound, 2 points per assist, 5 points per steal, 5 points per block, 5 points per three-pointer made. In one embodiment, no additional points will be given for three-pointers. Still further, any number of points may be awarded for any statistical category charted in professional basketball.

True Points: In one embodiment, points earned by players on a participant's fantasy team that are members of the true team will be designated as true points. In one embodiment, the total amount of true points will be multiplied by 110% and added to totals. This also incentivizes participants to play their true team players. In other embodiments, true points may be weighted by any percentage. The multiplying percentage may be any fixed number or percentage throughout the season. In one embodiment, true points are multiplied by 200% in order to incentivize participants to play their true team players.

30 Winners-One Champion: At the end of the regular season of basketball, or any other designated period, the participant from each of the 30 teams (or any number of teams competing in the fantasy league or division) with the highest total points accumulated will be the winner of their true team (e.g. #1 True Chargers Fan). In one embodiment, if there is a tie in total points, the true fan with the higher total of true points will be declared the winner. In case of multiple ties, in one embodiment, a drawing amongst the winners at each team's headquarters will determine the winner. In another embodiment, the system will randomly pick one bench player for each participant and keep track of the points score by the randomly picked player. The system may randomly select a new bench player each game and a total of points scored by the random selection will be used in the event of ties with other participants. In one embodiment, if the random player selected by the system is a member of the participant's true team, then a multiplier, such as 200%, may be used to tally additional points. In other embodiments, a multiplier is not used. The sixteen #1 true fans (winners) of the sixteen playoff teams, may follow along with their true team and the #1 true fan of the championship game will be the champion of the professional basketball team for that season.

Figure 17:
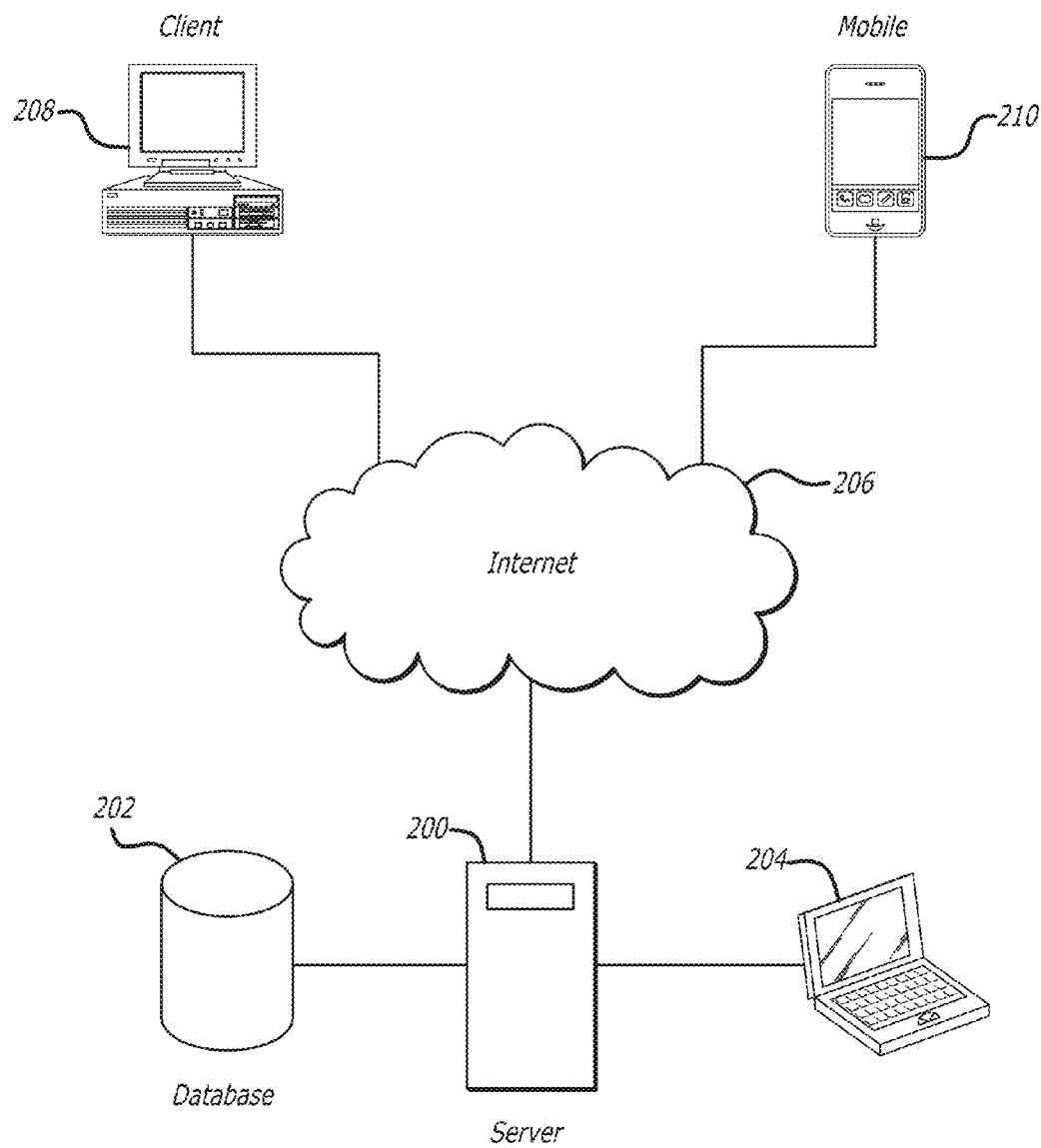
FIG. 17 depicts a diagram illustrating components of an embodiment of a fantasy league system over a network.

As shown in FIG. 17, the above embodiments for a fantasy league system can be implemented on a computer system that is accessible via a website over the Internet. The fantasy league website can be stored on a server 200, which may include one or more processors and memory devices. Data obtained from participants, such as identifying information, true team, and fantasy roster information may be stored on a database 202 that is in communication with the server 200. Information concerning the league, including player information, team information, division information, point totals, participant transactions made during the fantasy league, website information, and the like, may be stored on the database 202 or any memory associated with the server 200. Any non transitory computer readable medium may be used and associated with the server to store information concerning a plurality of fantasy players from base teams of a base league, and all related information concerning the fantasy player and their performance.

A back-end computer 204 may also be in communication with the server 200 to access and edit information stored on the server and/or database. The server or the back-end computer may be used to edit the pages of the website, such as updating professional team rosters, setting fantasy league rules, setting point values and true points, setting available prizes, and the like. Furthermore, the server 200 or the back-end computer 204 may analyze and send reminder to participants based on participant rosters. For instance, the server or back-end computer 204 may send a notification to a participant that his roster needs to be revised for a certain week or game because a selected player is playing against the participant's true team. Notification may also be sent out if the participant's roster needs to be revised because a currently selected player has a bye week or is otherwise into playing in the upcoming game. Other notifications, such as automatic changes made to a roster by the server 200 or back-end computer 204, may also be sent to participants. Notifications may be sent out via the server or back-end computer in the form of an email to a participant's email address that is stored on the database 202 and associated with the participant. In other embodiments, the notifications sent out by the server or back-end computer may be a text message to the participant's cell number or even a prerecorded (or live) phone call to the participant's phone number stored in the database. Having a system that sends notifications to participants as a reminder to adjust roster on a fantasy team helps to solve the problem of participants forgetting to set a lineup for the week or upcoming game, or forgetting to check which players are available for the upcoming game(s). The system may send out a reminder to all participants at a certain time to remind participants to review or modify their player rosters. The server 200 may also post notification directly to the fantasy website or a social media site. These notifications may be available to other participants in the league or made private so only the participant can view notifications form the server. The notification feature of the current system helps solve the problem of existing fantasy leagues that only post notifications on the fantasy website. Using the embodiments disclosed herein, users can receive notifications without logging onto the fantasy website in order to help participants field a full team every game.

The server 200 also may be used to calculate the standings every day or week based on total points for all leagues, divisions, and teams. The server may perform other functions for the system, including managing the fantasy league, managing the leader board or standings, and determining prizes or awards to participating members of the league. The server may manage the league by automatically limiting the use of any fantasy player playing against the selected favorite team from the base league during the fantasy sports league.

In other embodiments, each league or division of the league may have a manager that may log onto the server 200 through the Internet to manage and run the fantasy league by setting rules, point values, monitoring trades, and communicating to other participants in the league.

As shown in FIG. 1, the server is connected to the Internet 206. In this way, participant computers 208 can access the website on the server. Mobile or remote devices 210, such as cell phones, smart phones, tablets, and other computer devices, can access and receive information from the server 200 through the Internet as well. Participants may be able to receive notifications directly from the server 200 or back-end computer 202 on their mobile device (text, email, voice call) or information may be received through the participant's computer 208. Participants that log into the server 200 may then run their team and communicate with other participants or administrators. It should be understood that a plurality of mobile or remote devices may be connected to the server over the Internet 206 or any other network. In use the plurality of remote devices will have graphical user interface on the display screen to select a fantasy team of fantasy players from any base team of the base league, to select a favorite team from the base league, and make roster moves, if available. All selections and information provided from the remote devices made through the interface may be stored in the database or other non-transitory computer readable medium associated with the server.

Accordingly, what has been described is a method and system for a fantasy sports league or contest where true fans are rewarded. The approach involves avoiding the situation where your favorite team loses yet you win or do well in your fantasy league because fantasy players succeed against your favorite team. The system and method also provide a way to continue through the playoffs, where a fantasy champion is tied to the base league champion.

Thus, it will be apparent from the foregoing that, while particular forms of the invention have been illustrated and described, various modifications can be made without parting from the spirit and scope of the invention.

We claim:

1. A system for a fantasy sports league, comprising:
   a database storing a plurality of fantasy players from base teams of a base league;
   a plurality of remote participant devices connected to the database over a network, the plurality of remote participant devices having an interface to select a fantasy team of fantasy players from any base team of the base league and to select a favorite team from the base league, and the selections made through the interface on the remote participant devices are stored in the database; and
   a fantasy league server associated with the database and in communication with the plurality of remote participant computers over the network, and for each fantasy team selected by the plurality of remote participant devices, the fantasy league server automatically limits the use of any fantasy player playing against the selected favorite team from the base league during the fantasy sports league, and the fantasy league server sends notifications to the plurality of remote participant computers to modify selections made on the fantasy team.

2. The system of claim 1, wherein the fantasy league server awards additional scoring to any of the plurality of remote participants that use players from the participant favorite fantasy team.

3. The system of claim 1, wherein the league or contest continues through playoffs in the base league.

4. The system of claim 1, wherein at least one of the plurality of remote participant computers is a mobile phone.

5. The system of claim 4, wherein the fantasy league server sends notifications to the mobile phone through a text message.

6. The system of claim 4, wherein the fantasy league server sends notifications to the mobile phone as a voice message.

7. A method for a fantasy sports league, comprising:
   providing a plurality of fantasy players from base teams of a base league on a database;
   connecting a plurality of remote participant devices to the database over a network;
   receiving input from one of the plurality of remote participant devices using an interface to select a fantasy team of fantasy players from any base team of the base league and to select a favorite team from the base league;
   storing the selections made through the interface on the remote participant devices on the database;
   automatically limiting, via a fantasy league server associated with the database and in communication with the plurality of remote participant computers over the network, for each fantasy team selected by the plurality of remote participant devices, the use of any fantasy player playing against the selected favorite team from the base league during the fantasy sports league; and
   notifying, via the fantasy league server, any of the plurality of remote participant devices that a change to the selected fantasy players must be made.

8. The method of claim 7, further comprising calculating additional points to any of the plurality of remote participants that use players from the participant favorite fantasy team.

9. The method of claim 7, wherein at least one of the plurality of remote participant devices is a mobile phone.

10. The method of claim 9, wherein notifying the mobile phone of one participant through a text message.

11. The method of claim 9, wherein notifying the mobile phone of one participant through a voice message.

* * * * *